US010946422B2

(12) United States Patent
Jude et al.

(10) Patent No.: US 10,946,422 B2
(45) Date of Patent: Mar. 16, 2021

(54) SMALL-FOOTPRINT SYSTEMS, COMPONENTS, AND METHODS FOR STERILIZING MEDICAL WASTE

(71) Applicants: Peter A. Jude, Maple Lake, MN (US); Stephen E. Pellegrene, Plymouth, MN (US); Michael J. Hofer, Fargo, ND (US)

(72) Inventors: Peter A. Jude, Maple Lake, MN (US); Stephen E. Pellegrene, Plymouth, MN (US); Michael J. Hofer, Fargo, ND (US)

( * ) Notice: Subject to any disclaimer, the term of this patent is extended or adjusted under 35 U.S.C. 154(b) by 0 days.

(21) Appl. No.: 15/922,806

(22) Filed: Mar. 15, 2018

(65) Prior Publication Data

US 2020/0316660 A1     Oct. 8, 2020

(51) Int. Cl.
*B09B 3/00* (2006.01)
*B02C 23/20* (2006.01)
*B02C 23/16* (2006.01)
*B02C 23/02* (2006.01)

(52) U.S. Cl.
CPC ............ *B09B 3/0075* (2013.01); *B02C 23/20* (2013.01); *B02C 23/02* (2013.01); *B02C 23/16* (2013.01); *B02C 2023/165* (2013.01)

(58) Field of Classification Search
CPC ......... B09B 3/0075; B09B 3/00; B02C 23/20; B02C 23/02; B02C 23/16; B02C 2023/165; B02C 18/2216; B02C 25/00; B02C 19/0075; A61L 11/00; A61L 2/202; A61L 2/20; Y10S 241/606
See application file for complete search history.

(56) References Cited

U.S. PATENT DOCUMENTS

| 3,899,684 A | 8/1975 | Tenney |
| 5,366,703 A | 11/1994 | Liechti et al. |
| 9,220,798 B2 | 12/2015 | McKee et al. |
| 9,943,892 B2 | 4/2018 | Burlin et al. |
| 2009/0123339 A1* | 5/2009 | Sampson ............... A61L 11/00 422/105 |
| 2015/0139854 A1* | 5/2015 | Jude ....................... A61L 2/202 422/28 |

* cited by examiner

*Primary Examiner* — Xiuyu Tai
(74) *Attorney, Agent, or Firm* — Fantastic IP Consulting; Eduardo E. Drake

(57) ABSTRACT

Many hospitals and medical facilities have a need to safely dispose of their biomedical waste. Onsite processing, particularly with ozone, is often less expensive and safer than off site handling, but many facilities lack the room for conventional ozone equipment with appropriate capacity to meet their needs. Accordingly, the present inventors devised, among other things, an exemplary system that includes, among other features, an shredder, an upwardly inclined auger chamber, and a waste receptacle. The shredder shreds unsterilized waste and feeds into the lower end of the inclined auger chamber. The chamber includes ozone injectors to treat waste as the auger conveys it upward toward an outlet that drops the sterilized waste into the waste receptacle. The incline of the chamber allows for a smaller system footprint with sufficient processing capacity to satisfy the needs of smaller hospitals and clinics.

20 Claims, 10 Drawing Sheets

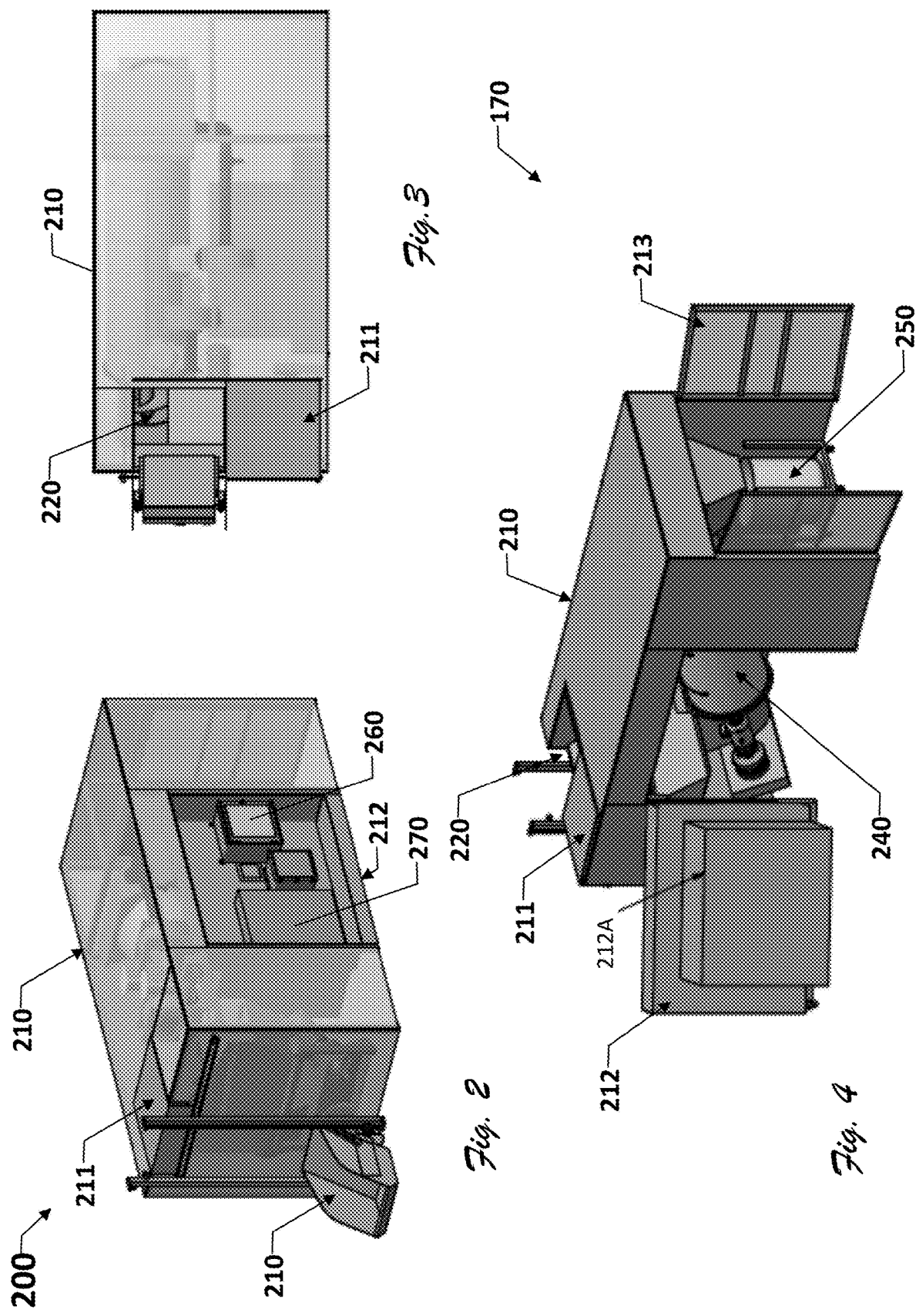

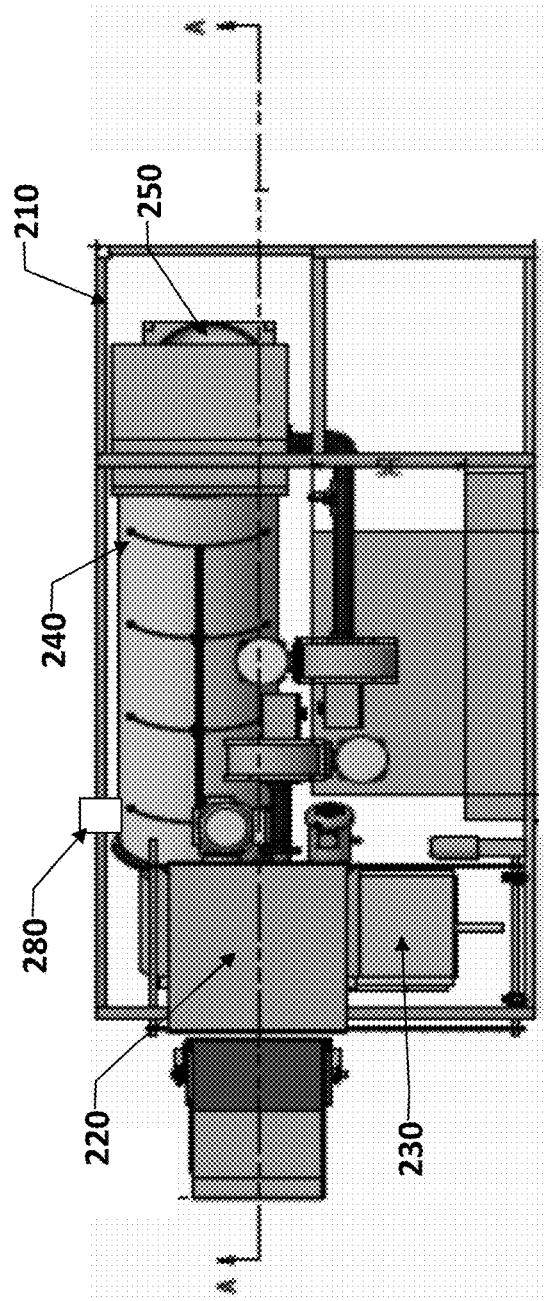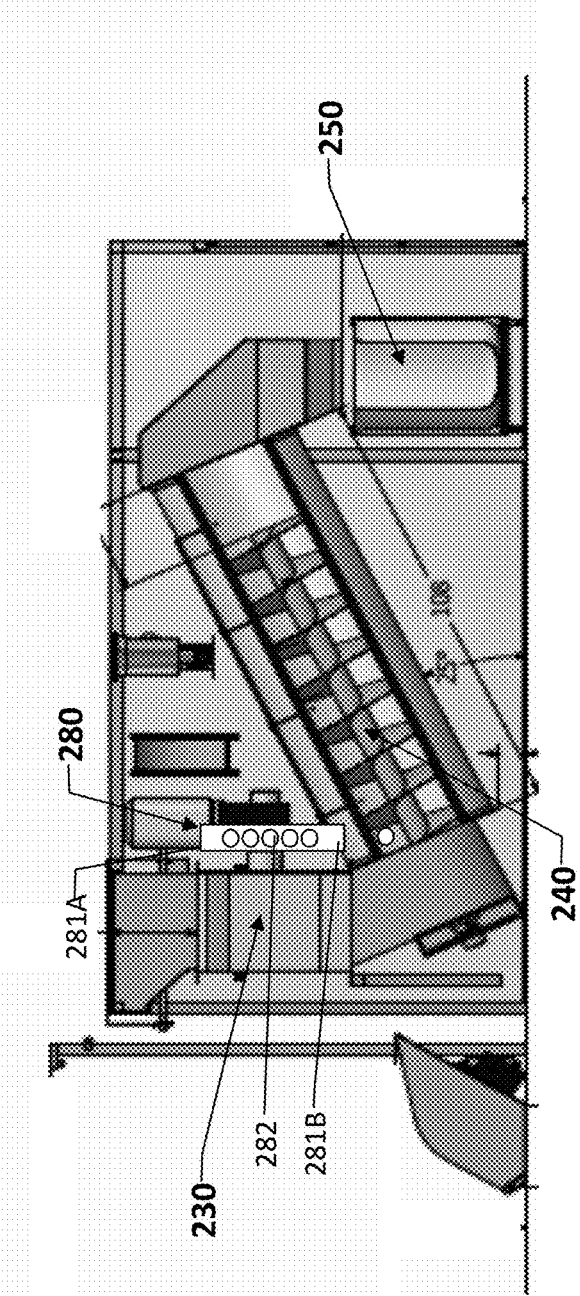

SMALL-FOOTPRINT SYSTEMS, COMPONENTS, AND METHODS FOR STERILIZING MEDICAL WASTE

RELATED APPLICATIONS

The present application claims priority to International Application PCT/US17/22381 which was filed Mar. 14, 2017 and which claims priority to U.S. Provisional Patent Application 62/308,165 filed on Mar. 14, 2016. Both applications are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2016, Peter A. Jude, Stephen E. Pellegrene, Michael J. Hofer

TECHNICAL FIELD

Various embodiments of the invention concern medical waste treatment, particularly systems and methods using ozone gas.

BACKGROUND

One of the most important concerns of public health systems across the world is controlling or reducing the spread of infectious diseases. This concern is particularly acute in hospitals and other medical care and testing facilities where ill patients come into contact with caregivers, other patients, and visitors. These facilities employ elaborate measures to reduce this risk, including not only mandatory hand-washing and frequent sanitization of equipment, furniture, walls, and floors, but also use of disposable products, such as syringes and hypodermic needles, gloves, bandages, etc. Additionally, great care is taken in disposing of medical waste, particularly biomedical waste.

Biomedical waste includes blood and blood products, tissues removed during surgery and disposable items used and discarded in the normal course of surgical and other medical procedures. Many cities and states mandate special processing of biomedical waste, typically by incineration, autoclaving, or chemical sterilization, to destroy disease-causing pathogens before allowing the waste into local landfills. However, incineration and autoclaving are expensive in terms of their energy usage and affect on local air quality, and chemical sterilizers are typically toxic, posing additional risks to waste-management workers and the environment.

In response to these shortcomings, some waste-treatment processors have built systems that sterilize waste using ozone gas, a form of oxygen that reverts to natural oxygen after performing its sterilization function. For example, U.S. Pat. No. 7,550,111 describes a vertically oriented machine that drops biomedical waste from a top-mounted hopper through a shredder into an ozone-treatment chamber. The chamber holds and exposes the shredded waste to ozone for a period of time, such as 15 minutes, before conveying into a collection bin for later transport to a landfill.

One problem that the present inventors recognized with this system is that its waste-processing speed (throughput) is less than desirable for some medical facilities. The low throughput can result in prolonged storage of unsterilized waste as it awaits processing, exposing staff and patients not only to unpleasant odors, but also to a risk of infection.

In response to the throughput problem, the present inventors developed and patented the ozone-based system described in U.S. Pat. Nos. 8,518,339; 8,652,405; and 8,784,746. This system, sold under the Clean Waste Systems brand, provided a significant boost in throughput over that described under U.S. Pat. No. 7,550,111. However, not content to rest on their laurels, the present inventors recognized a further need for systems not only with greater throughput but also a smaller footprint to accommodate onsite processing of waste in smaller hospitals, clinics, and other medical facilities.

SUMMARY

To address this and/or other needs, the present inventors devised, among other things, exemplary systems, methods, and related components for processing biomedical waste and non-hazardous pharmaceuticals using ozone. One exemplary system includes a hopper, a shredder, a pressurized auger, and a waste receptacle, with hopper and shredder position to feed shredded waste into the auger. The pressurized auger is inclined and includes ozone injectors to treat waste as the auger conveys it upward toward an outlet that drops the sterilized waste into the waste receptacle.

In some embodiments, the pressurized auger exists within a first chamber having a first cross-sectional area and outputs waste through a port into a second chamber, with the port having a second cross-sectional area less than the first cross-sectional area, for example 50% or more less than that of the first chamber. The second chamber also has a length substantially less than that of the first chamber, and includes a mechanism for biasing shredded waste within the second chamber toward the first chamber, effectively creating a plug of shredded waste against the port to facilitate maintaining pressure and ozone concentration within the first chamber as waste is conveyed into the second chamber. In some embodiments, the bias mechanism includes a weighted door that pivots open in response to shredded waste moved by the auger through the port and against the door. Weighted plates can be added to or removed from the door in some embodiments to allow calibration of the plug seal. Still other embodiments provide an automatic tensioning or resistance mechanism on the door to dynamically adjust the plug seal to maintain predetermined pressure conditions within the first chamber or ozone levels within the second chamber.

BRIEF DESCRIPTION OF THE DRAWINGS

Various embodiments are described herein with reference to the following attached figures (FIGS.). These figures are annotated with reference numbers for various features and components, and these numbers are used in the following description as a teaching aid, with like numbers referring to the same or similar features and components.

FIGS. 2, 3, 4, 5, and 6 are views of an exemplary waste treatment system 200, which is similar in some respects to system 100 and which corresponds to one or more embodiments of the present invention.

DETAILED DESCRIPTION OF EXEMPLARY EMBODIMENTS

This document, which includes the referenced drawings and appended claims, describes one or more specific embodiments of one or more inventions. These embodiments, offered not to limit but only to exemplify and teach the invention(s), are shown and described in sufficient detail to enable those skilled in the art to implement or practice the inventions. Thus, where appropriate to avoid obscuring the invention, the description may omit certain information known to those of skill in the art. This description also incorporates the disclosures of U.S. Pat. Nos. 8,518,339; 8,652,405; and 8,784,746 herein by reference.

This document may use relational terms, such as second, top and bottom, and the like. These terms may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to be open ended, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without further constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Exemplary Systems

Figure 1:
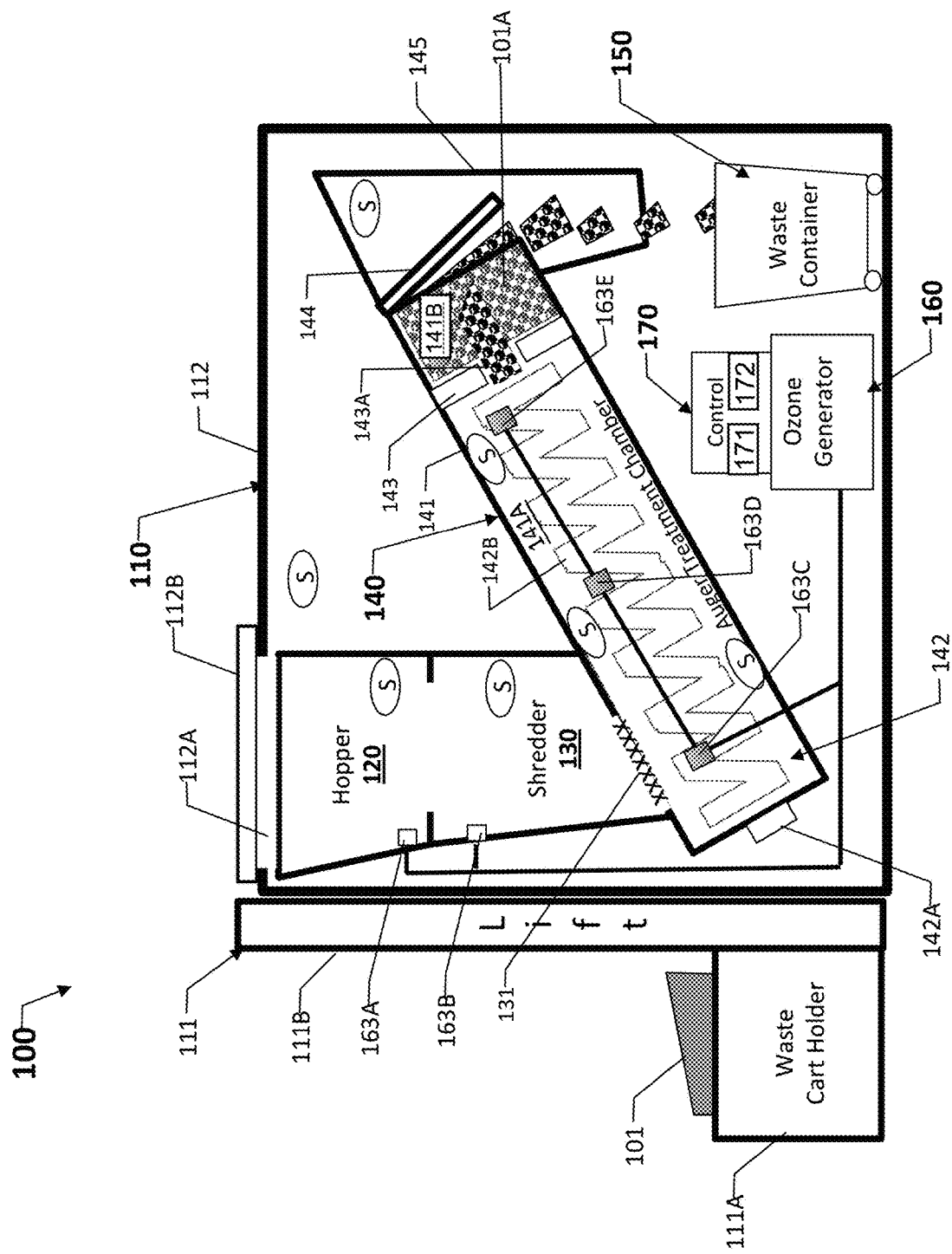
FIG. 1 is a schematic diagram of an exemplary waste treatment system 100 which corresponds to one or more embodiments of the present invention.

FIG. 1 shows an exemplary medical waste treatment system 100. System 100 includes a housing assembly 110, a hopper 120, a shredder 130, an inclined waste treatment chamber 140, a waste receptacle (or container) 150, a control module 160, and an ozone module 160.

Housing assembly 110, formed of high grade plastic, steel, or other durable materials, includes a lift assembly 111 and a body 112. Lift assembly 111 includes a cart holder 111A and lift mechanism 111B. Cart holder 111A holds at least one cart of biomedical and/or pharmaceutical waste 101. In some embodiments, cart holder 111A also includes a digital scale or other waste analysis sensors not shown. Cart holder 111B is mechanically attached or linked to lift mechanism 111B, which may be electromechanical, hydraulic, or pneumatic and which is configured to lift waste cart holder 11A above the height of housing assembly 110 and dump its contents through opening 112A of body 112 into hopper 120. Some embodiments include a lid assembly 112B which is opened and closed automatically in unison with or at a faster rate than the lifting and lower of the cart holder.)

Hopper 120 receives biomedical waste for processing. In the exemplar embodiment, the hopper has a capacity of 33.25 cubic feet of material. In some embodiments, hopper 120 includes one or more ozone injectors for reducing waste odors and sainting the hopper. Moreover, some also embodiments also fluidly couple the hopper to an exhaust fan and an ozone destruct system for exhausting substantially ozone freewaste gases to atmosphere. Hopper 120 includes a bottom opening 121 which allows waste to fall under the weight of gravity onto shredder 130.

Shredder 130, which is positioned underneath hopper 110, receives waste from hopper 110. In the exemplary embodiment, shredder 120 includes a 2- or 4-shaft shredder and a lower opening covered by a screen 131. Exemplary shredders include SSI Shredder Systems Model Q55ED Shredder or Q70ED (36"×31" or 44"×40" cutting chamber) to shred the material by up to 90%. The exemplary screen includes openings of approximately 0.75-2.0 inches in diameter or maximal width for non-circular geometries which restricts the maximal size of the waste particles allowed to enter inclined waste treatment chamber 140.

Chamber 140 includes a body 141, a waste transporter or conveyor assembly 142, and a partition 143, an exit control member 144, waste exit chute 145, and ozone injectors 146. Body 141, formed for example of a substantially fluid-tight cylindrical metal, plastic (PVC), or composite tube, is generally inclined, for example at 20, 25, 30, 40, or 45, 50, 60, 70, 80 or in some instances even 90 degrees relative to horizontal. The chamber, which is also sealed from the remaining interior volume of housing body 112, contains waste transporter assembly 142.

Waste transporter assembly 142, in the exemplary embodiment, takes the form of a screw type auger compactor, which includes an auger motor 142A and an auger screw 142B. The auger screw extends from a lower end of the chamber up to partition 143, which divides the chamber into a treatment portion 141A and an exit or plug portion 141B. Partition 143, formed or plastic or metal plate, includes a central circular port or opening, which is less than 75% of the diameter or maximal width of chamber body 141. In some embodiments, the port has a diameter that is 50% or less than that of the chamber. In still others, two, three, four, or five ports are provided. The function of the ports is allow portions of treated waste to pass from treatment portion 141A into exit portion 141B as auger screw 142B moves the waste in a helical pattern into the plane defined by the partition. Although the partition is shown as a simple planar structure in the exemplary embodiment, some embodiments may form the partition as a parabolic, spherical, conical surface; and still others provide concave or even convex surface geometries. Some embodiments may combine the shredder and auger into a single machine. Also some embodiments use a Sani-Tech System ST1546/36-15HP Refuse & Recycling Compactor. The exit portion 141B is generally less than 20 or 30% of the full length of chamber 141, is terminated with an exit control member 143.

Exit control member 143 not only partly governs the rate of exit of treated waste from chamber 141, but also forces the treated waste within the exit portion to form a waste plug that at least partially seals off or constricts flow of ozone out of the chamber, thereby assisting in maintaining the desired ozone concentration and other sterilization conditions within the chamber. In the exemplary embodiment, the chamber takes the form of horizontally hinged metal door with optional weights to change the amount of back pressure the door applies to treated waste within the exit portion of the chamber, thereby setting the level of sealing of the chamber or density of treated waste within the exit portion. Some embodiments replace or augment this simple weighted mechanism with an automatic mechanical, electromechanical, hydraulic, or pneumatic arrangement that varies the back pressure of the door on the treated waste plug 101A to maintain a desired waste exit rate, waste density, chamber ozone concentration, or ozone leakage. In some embodiments, the door may include a raised interior portion that engages with the interior rim of the chamber to further restrict exit of waste around regions of the door closer to the hinge.

Waste exit chute 145 guides waste that falls past exit control member 143 into waste container 150. In some embodiment, waste container 150 includes wheels. In still others it includes automatic bagging equipment.

System 100 also includes ozone assembly 160 and control assembly 170. Ozone assembly 160 includes an ozone generator 161 and ozone distribution system 162. Ozone distribution system 162 includes ozone injectors 163A (in hopper), 163B (in shredder), 163C-E (in chamber) in fluid communication with ozone generator 161. Control assembly 170, which includes a controller 171, a touch-screen control panel 172, and a network or distributed sensor units, denoted S in the figure. Controller 171 includes one or more processing or control circuits, which provide control signals to various valves and safety interlocks (not shown) in accord with machine-readable and executable instructions and control parameters stored in memory. For example, in the exemplary embodiment control module 171 includes a resettable and programmable dwell timer implemented in software, hardware, or firmware and configurable via control panel 172. (In some embodiments, processor 171 takes the form of a programmable logic controller.) The sensor units include ozone, temperature, humidity, and/or pressure sensors that are hardwired or wirelessly linked to controller 171. Additionally, the sensor network includes shredder load sensors, for example in the form of a self-calibrating current sensing switches coupled to sense electrical current drawn by the shredder.

In some embodiments, ozone generator 161, which includes a humidifier for humidifying ozone gas. In some other embodiments, a humidity generator module is used to control humidity with the treatment chamber. The humidity generator can take the form of a two-pressure two-temperature, hybrid humidity generator which generates humidity by fully saturating gas at a known temperature and pressure, then reducing the pressure to a lower value (typically ambient) and cooling or warming to an alternate temperature. Humidity produced by this hybrid technique is determined from measurements of the temperatures and pressures alone, and does not rely on measurement of the water vapor content of the gas. A generator of this type is used to establish relative humidity in excess of 70% within the chamber, and preferably grater than 80, 85, 90, and 95%. Moisture-saturated ozone gas has much higher oxidation potential than dry gas, enhancing sterilization efficacy of the ozone and reducing flammability.

In general operation, once controller 170 establishes proper sterilization conditions within chamber 140, waste material 101 is fed through hopper 120 onto shredder 130, where it is shredded and screened, falling under its own weight into the chamber 140. Auger 142 within the chamber then transport the shredded wait ad t controlled pace (for a defined period of time, such as 45, 50, 55, or 60 minutes depending on the ozone concentration and relative humidity) through the chamber, allowing it to move be fully exposed and sterilized when it reaches partition 143. As the sterilized waste is pushed through port 143A, it backs up against exit member, sealing the chamber. As more waste is sterilized and feed into the exit portion of chamber, it eventually creates forces open the exit member, dropping into waste container 150. Notably, the shredder and auger operate continuously, that is without stoppage, as long as waste is available in the hopper and the shredder is shredding, providing increased throughput over typical systems that stop shredding to allow for static dwell of small batches of waste. In the exemplary embodiment, the dwell or treatment time is controlled by the control module, which includes a treatment bin timer, or dwell timer. The timer is set and selectively reset by the controller based on activity of the auger or shredder in some embodiments, specifically the electrical current load on the auger or shredder as sensed by sensor 159. More specifically, the exemplary system starts the timer with the initial start of the auger and every time the auger is stopped and restarted in sync with the shredder, ensuring that any waste that enters the chamber does not exit the chamber until it has gone through at least one full treatment period.

FIGS. 2, 3, 4, 5, and 6 show various views of an exemplary waste treatment system 200, which is similar to system 100. System 200 includes a housing assembly 210, a hopper 220, a shredder 230, an inclined waste treatment chamber 240, a waste receptacle (or container) 250, a control module 260, an ozone module 270, and a test pod dispenser assembly 280. Housing assembly 210 includes a sliding hopper door 211, a vault-style side door 212 and waste output door 213. Sliding hopper door 211, which slides horizontally along the width dimension of the housing, controls access to hopper 220, which is positioned underneath. Vault style side door 212, which swings outward in this embodiment as in FIG. 4, includes a rectangular recess 212A. Recess 212A contains control module 260 and ozone module 270.

Figure 6A:
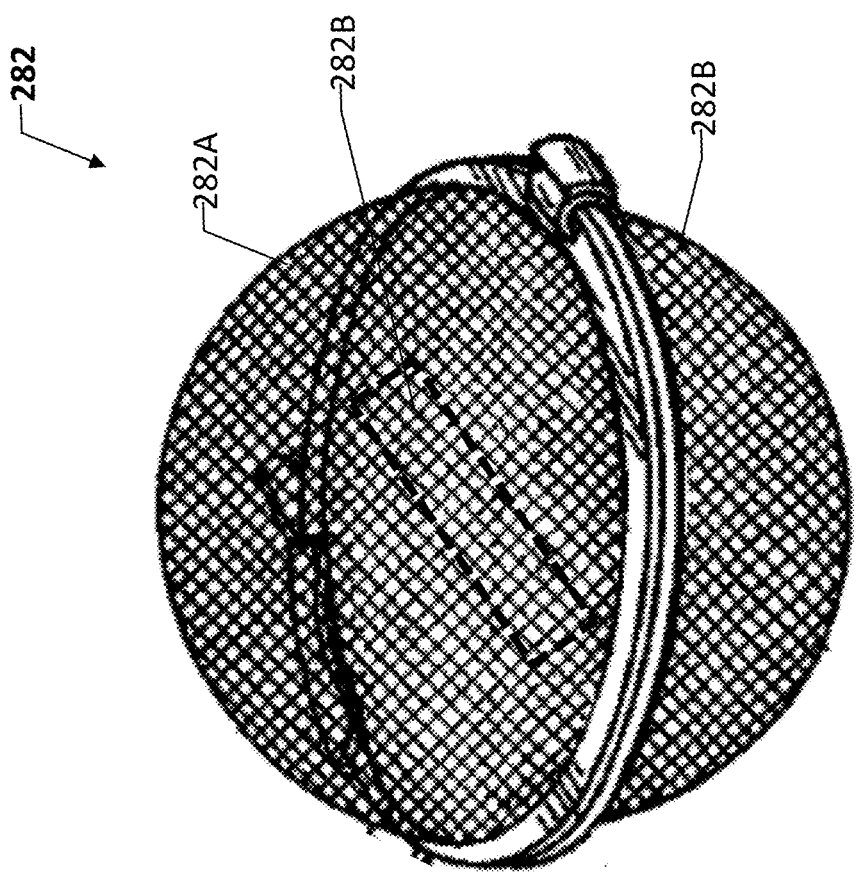
FIG. 6A is a perspective view of an exemplary test pod assembly portion of system 200, corresponding to one or more embodiments of the invention.

Some embodiments also include test pod dispenser assembly 280 mounted on or adjacent to the sidewall of housing 210 (as shown in FIG. 5 and shown more fully in FIG. 6). Assembly 280 includes a vertical dispenser 281 and a set of two or more test pods 282. Vertical dispenser 281 includes top and bottom hydraulic or motor-operated fluid-tight lids 281A and 281B, with top lid 281A configured to receive and hold a stack of test pods 282, and bottom lid 281B configured for opening and closing to selectively gravity feed one or more of the pods according to a timed sequence (governed by control module 260) into the lower region of chamber 210 below the shredder. Each test pod 282, shown best in FIG. 6A, includes a gas and vapor permeable enclosure 283 and one or more enclosed test spore strips 284. In some embodiments, the enclosure takes the form of a stainless steel mesh sphere having two threadedly or hingedly engaged mesh hemispheres 283A and 283B, enclosing test spore strips 284. Other embodiments use alternative shapes enclosures. Exemplary test spore strips include 1.0-inch×0.25-inch Log 6 *Bacillus Atrophaeus* spore strips, manufactured by MesaLabs of Bozeman, Mont. To prevent premature exposure of the test strips to ozone in the vertical housing, some embodiments positively pressurize the vertical dispenser during opening of bottom opening 281B. In some embodiment, the control module is programmed to release one or more test pods at the start of every treatment cycle.

Exemplary Method(s) of Operation of Exemplary System

Figure 7:
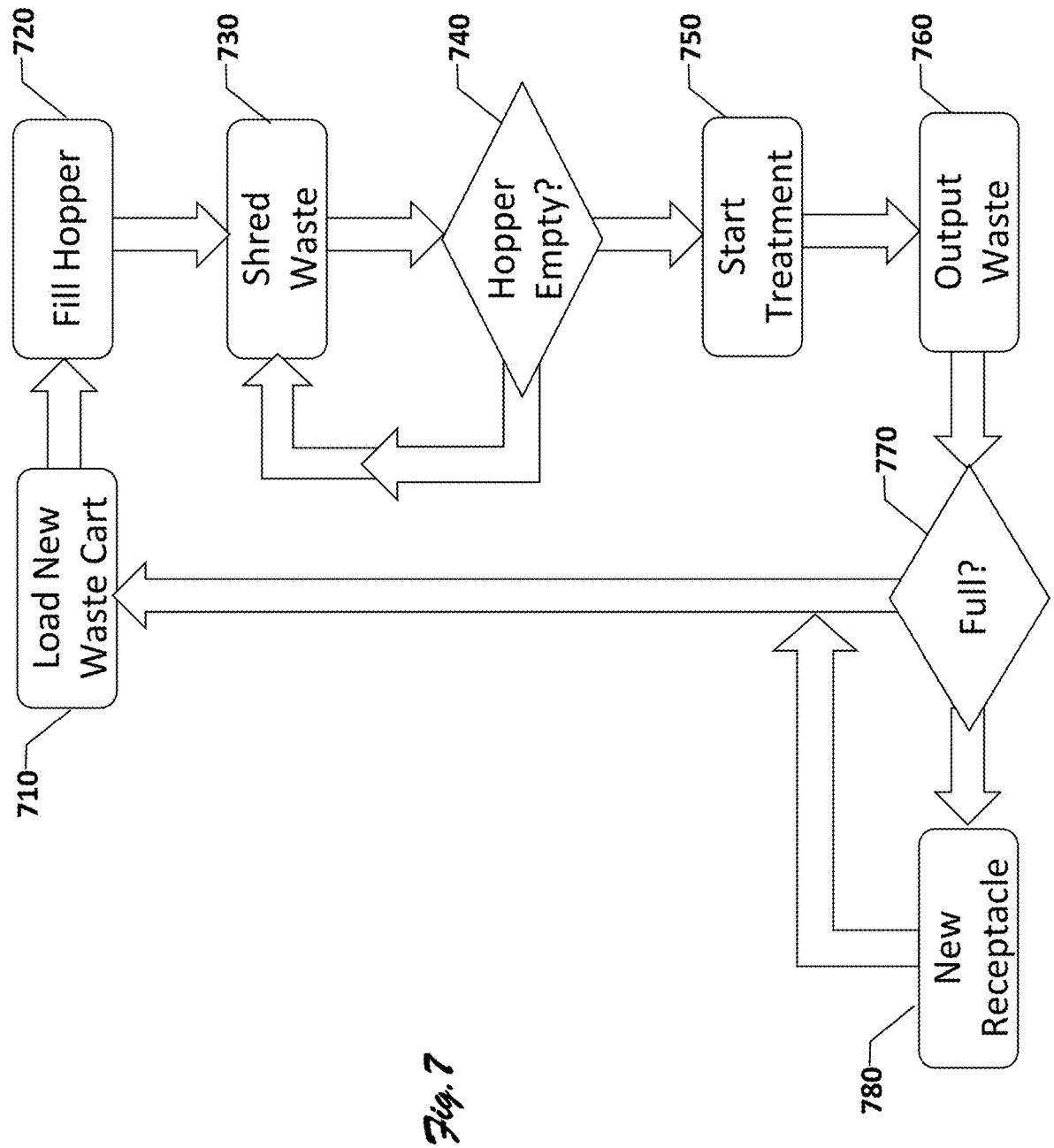
FIG. 7 is a flow chart of an exemplary method of operating a waste treatment system, such as system 100 and/or system 200, and which corresponds to one or more embodiments of the present invention.
Figure 8:
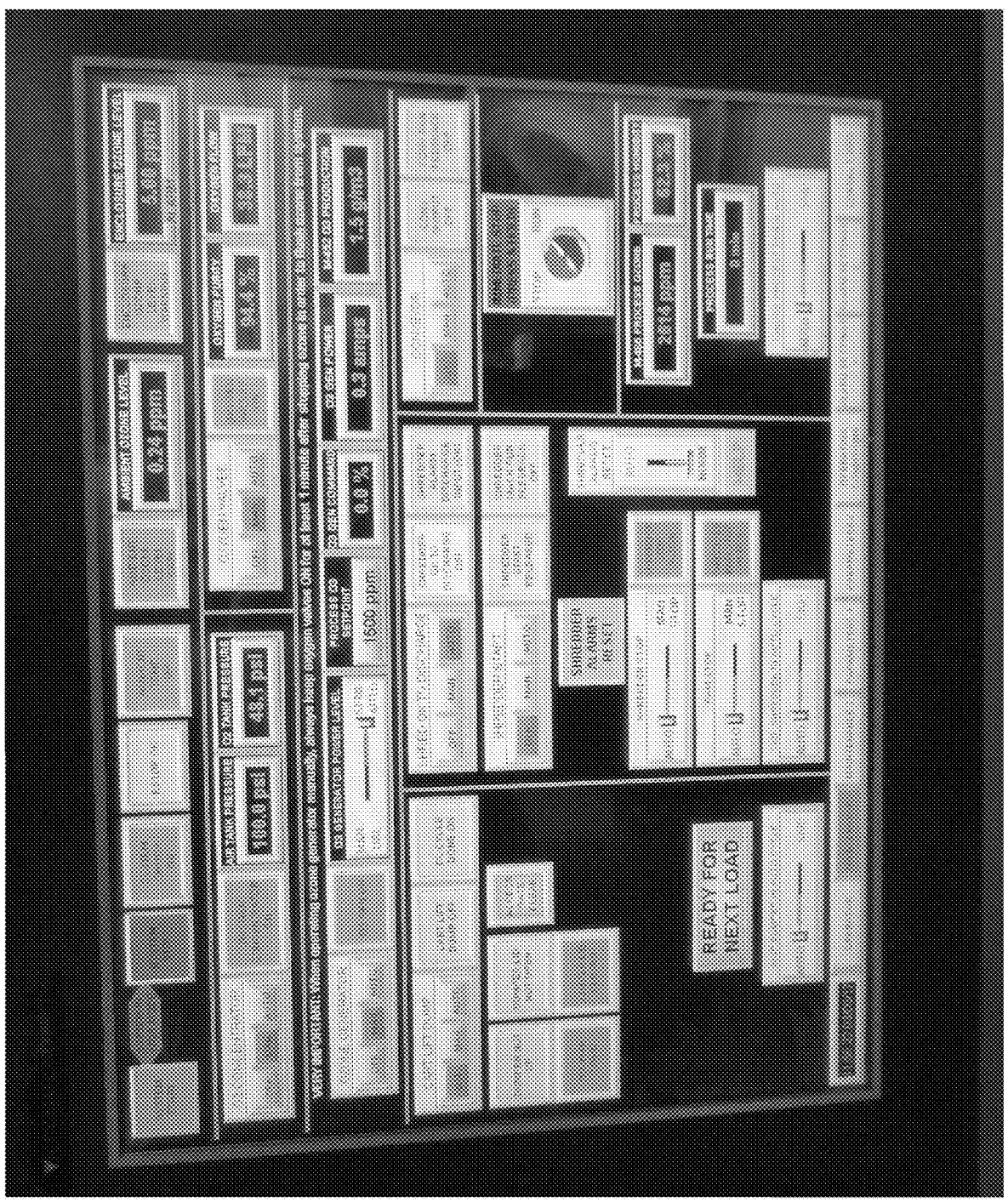
FIGS. 8 and 9 are screen shots of a touch screen control interface display for use with system 100 and 200, and thus correspond to one or more embodiments of the present invention.
Figure 9:
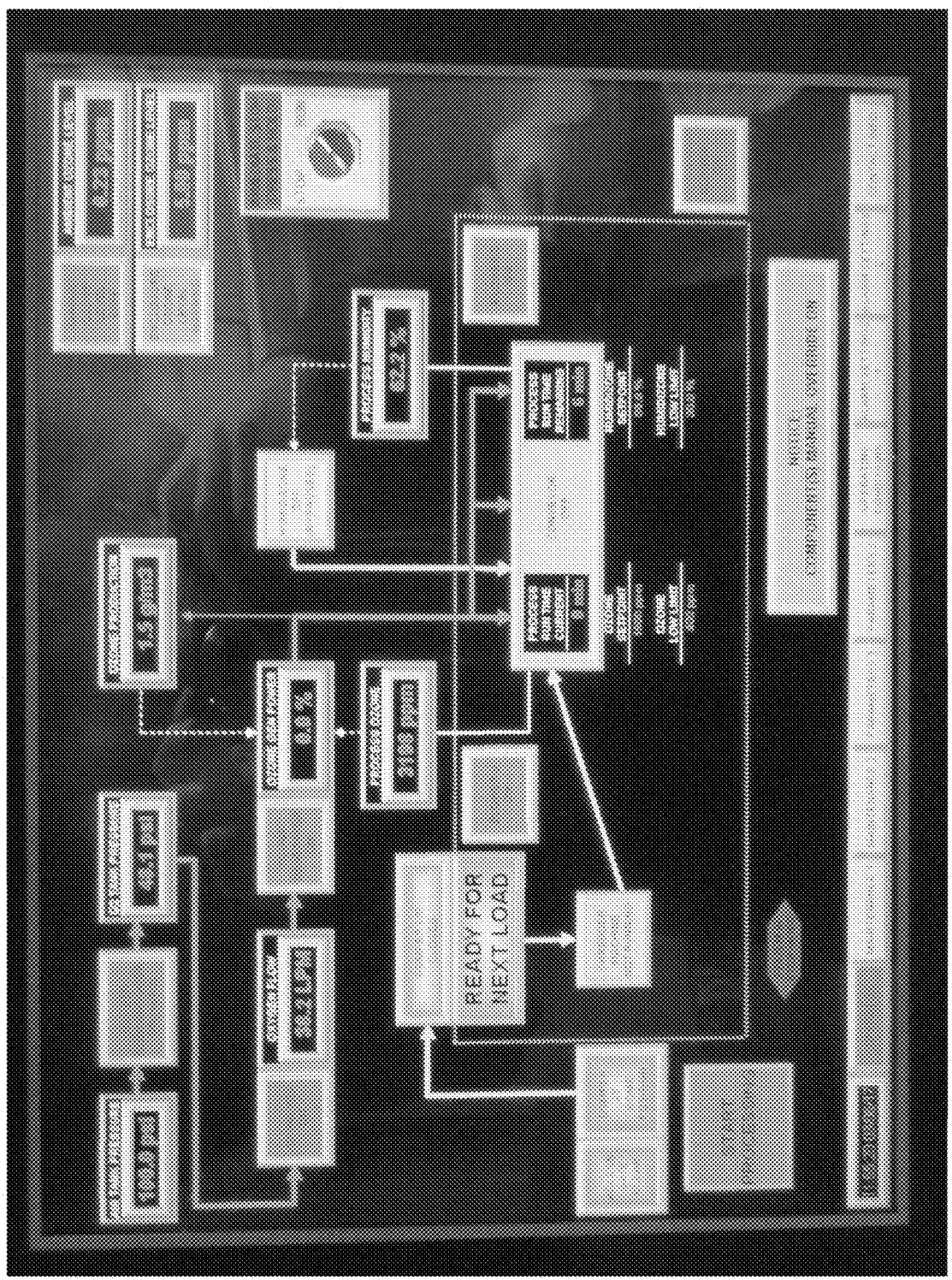
Figure 10:
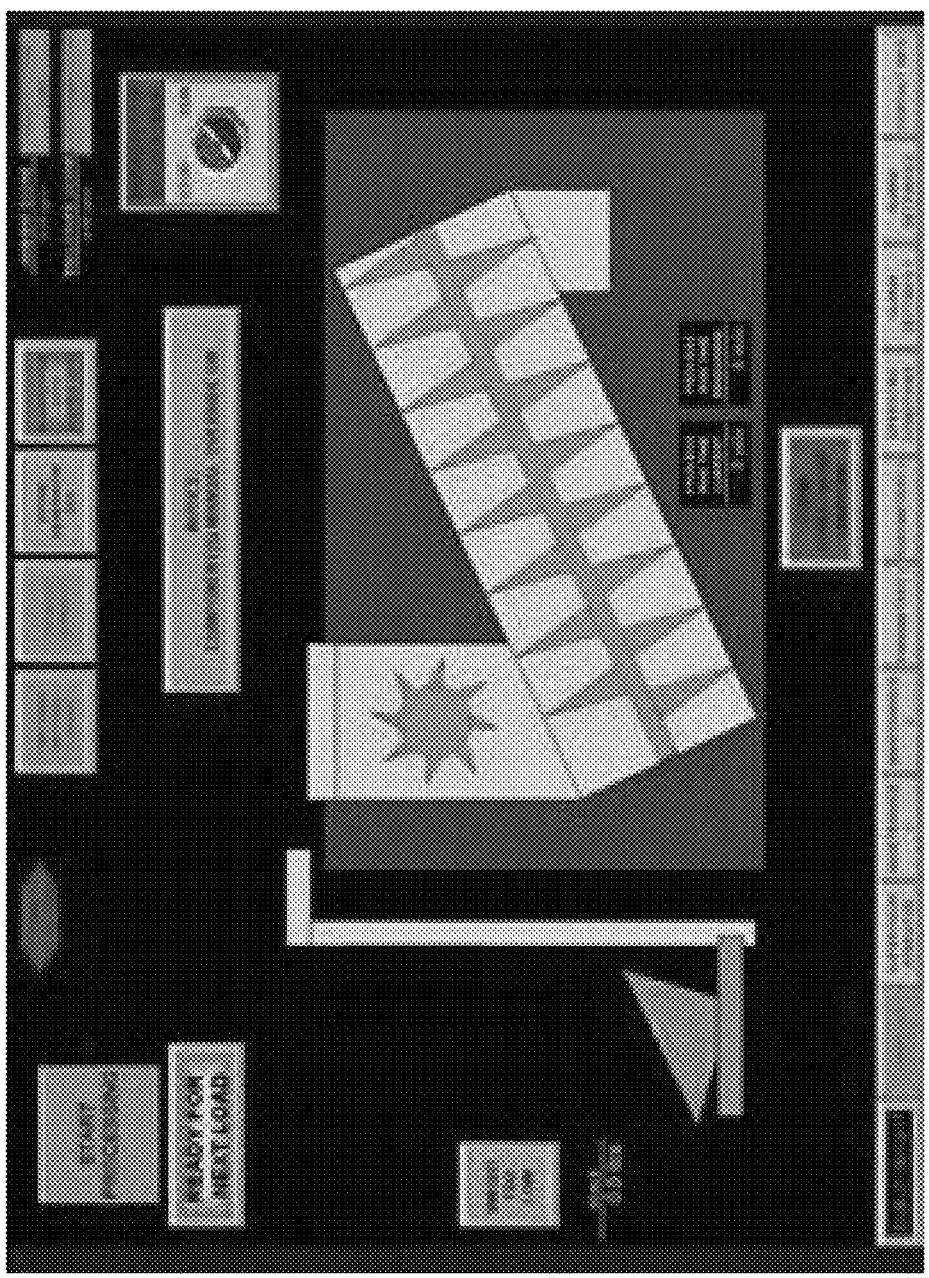
FIGS. 10, 11, and 12 are alternative screen shots of a touch screen control interface display for use with systems 100 and 300, corresponding to one or more embodiments of the invention.
Figure 11:
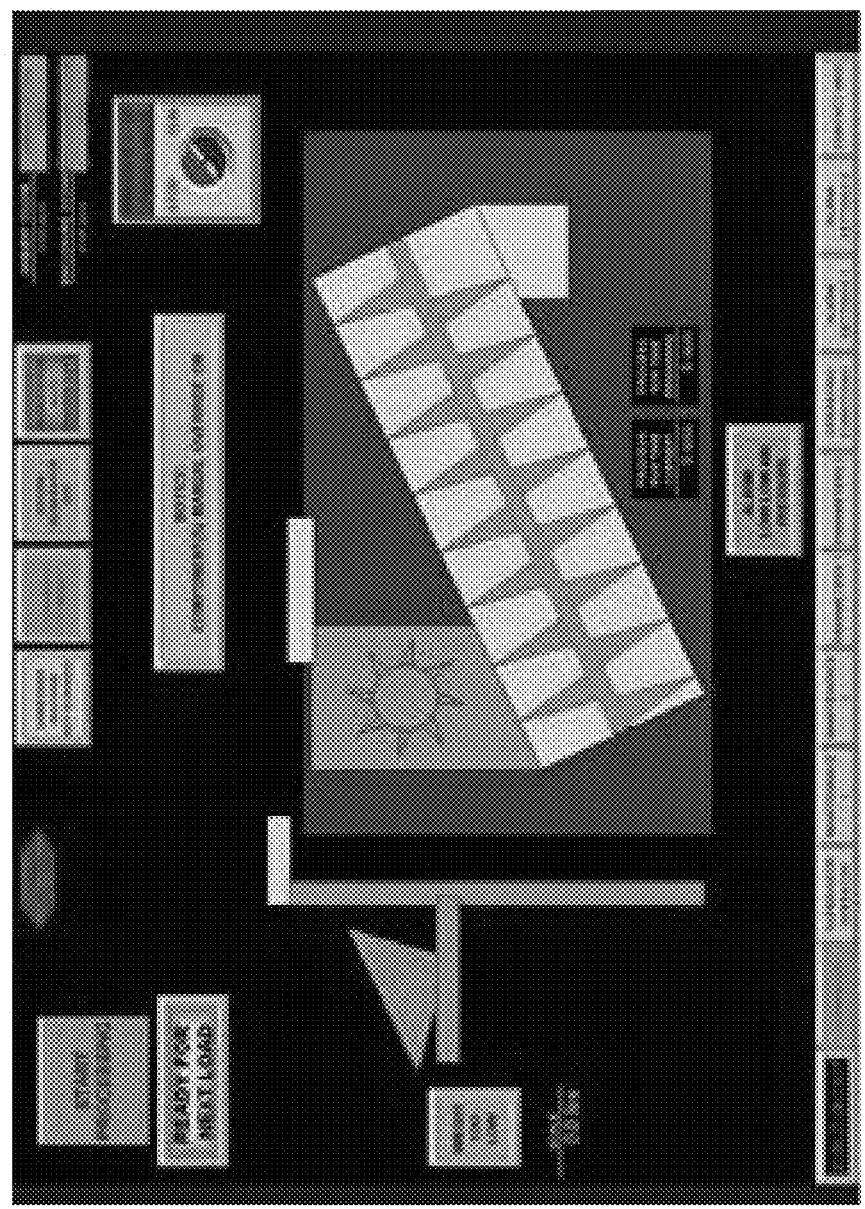
Figure 12:
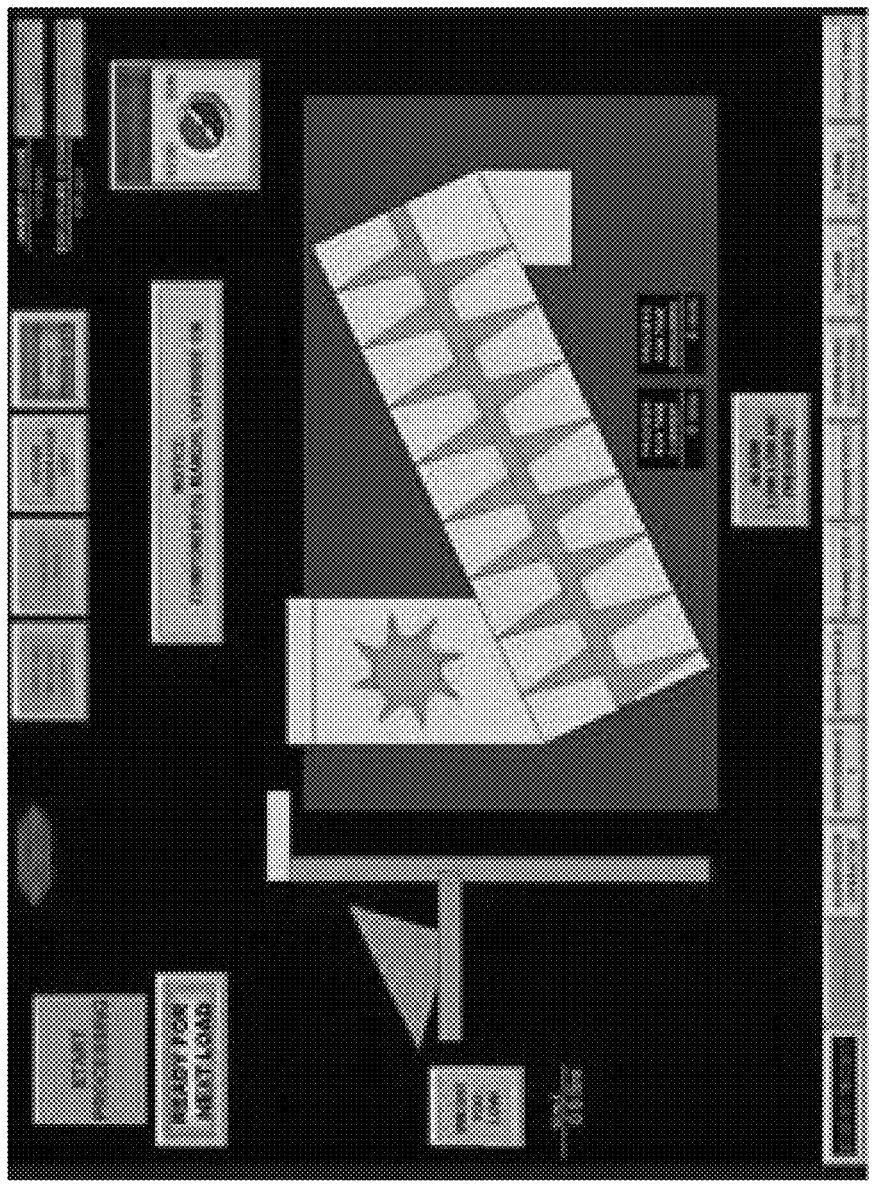

FIG. 7 shows a flow chart 700 of an exemplary method of operating a biomedical waste treatment system, such as system 100 or system 200. Flow chart 700 includes process blocks 710-780.

At block 710, the exemplary method begins with loading a waste cart, for example, 60, 95, or 150 gallons, into a cart lift assembly and manual actuation of a start button. However, in some embodiments, the system autostarts upon proper registration of the cart into the lift system, as detected via one or more microswitches or other types of sensors. Starting begins a process of establishing desired environmental conditions within the system, including establishing desired ozone PPM (parts per million), temperature, and/or humidity according to pre-programmed levels prior to loading waste into the hopper. In some cases, the levels are stored in a memory accessible via controller and/or processor. Some embodiments include multiple temperature, humidity, and ozone ppm levels, with one set of levels or thresholds for various sections of the system, such as the hopper and auger treatment chamber, allowing further control, monitoring, and/or regulation of sanitization conditions. Once the system has established desired conditions in one or more areas, execution continues at block 720.

Block 720 entails filling the hopper with waste from the cart. In the exemplary embodiment, this entail automatically weighing and recording the weight of the loaded waste receptacle into memory with an associated date stamp, incrementing a load counter in memory, and then lifting the container using the electric lifter. Once the lifting of the receptacle begins, the hopper door slides open, the ozone destruct fan starts to evacuate ozone from the hopper area to prevent its escape into atmosphere, and the lifter continues to lift and finally dumps waste from the receptacle into the hopper. The receptacle is then emptied and after X amount of seconds, for example, 10, 20, 30, 40, 50, 60, 90, 120, the receptacle returns to its original position and is ready for the next load of untreated waste. As the receptacle leaves the hopper area, the system closes the hopper lid to seal off the hopper area. Execution then continues at block 730.

Block 730 entails pretreating and shredding of the waste. In the exemplary embodiment, this entails continued injection of ozone into the hopper and treatment chamber to establish or maintain desired sterilization conditions. When conditions are at a desired level in the treatment chamber, the screw auger and the shredder/rotor start operating and continue operating as long as sufficient load on the shredder and the desired sterilization conditions are maintained. During shredding, a mechanical ram (not visible) guides the waste onto/into the shredder roter. The waste is shredded until it falls through a shredder output sizing screen onto one end region of the screw auger within chamber 140 or 240, with the mechanical ram advancing from a first—for example retracted or fully open—position to a second—extended or fully closed—position.

At block 740, the system determines whether the hopper is empty, that is whether there is additional waste in hopper to be shredded. In the exemplary embodiment, this entails monitoring shredder load via a mechanical shredder ram and/or electrical current draw of the shredder. Some embodiments optically determine the fill status of the hopper using multiple photo electric sensors or digital cameras with digital comparison of images taken at various points in time. If the hopper is not deemed empty, execution branches back to block 730, and the shredder and auger continue operating. If the hopper is determined to be empty, shredder operation is halted, for example, immediately or after a predetermined delay of 10, 30, 60, or 90 seconds, and execution proceeds to block 750.

Block 750 entails initiating measurement of a treatment period for shredded waste within the chamber. In the exemplary embodiment, this entails starting or resetting a treatment timer within the system controller/processor when the desired sterilization conditions within the chamber are satisfactory. Exemplary treatment times include 30, 45, and 60 minutes. Some embodiments pause the timer and auger when the desired sterilization conditions are not satisfied and resume when they are restored. In some embodiment, the auger RPM (Rotations Per Minute) is calibrated to ensure that waste transport time from chamber entry to the exit portion of the treatment chamber equals the predetermined treatment time, ensuring that waste exiting the chamber has been exposed to the sterilization conditions long enough to achieve the desired sterilization. Execution continues at block 760.

Block 760 entails outputting treated waste from the system. In the exemplary embodiment, treated waste is output from the exit area in an exit shoot into a waste receptacle, under force of gravity as the auger continues to turn and urge more waste into the exit area. Some embodiments include exit control member 143 which provides a bias weight beyond the waste's inherent weight to impede the movement of waste out of the exit area, thus promoting formation of a larger denser waste plug that reduces outflow of ozone from the chamber. More generally, the larger denser plug also promotes efficiency in maintaining desired sterilization conditions within the chamber. (Note that the exit member can also help with establishing initial sterilizations conditions for an empty chamber.) As waste accumulates in the exit area, it eventually becomes dense enough through continual compaction of the auger movement to overcome the gravitational and/or exit member bias and fall into the exit shoot. As the waste falls through the exit shoot it lands in a waste receptacle. The exit shoot area is fluidly coupled to an ozone destruct system to prevent escape of any residual ozone to atmosphere. Execution continues at block 770.

Block 770 entails determining whether the waste receptacle is full. In the exemplary embodiment, this entails checking a waste load counter against a threshold load count. If the waste load counter is less than the threshold load count (for example 5), the waste receptacle is deemed not to be filled, and execution branches back to block 710, to permit loading of another cart load of untreated waste into the hopper. However, if the waste load counter is equal to or greater than the threshold load count, execution continues to block 780.

Block 780 entails replacing the full the system indicates that the waste receptacle is full, for example, providing an audible and visual alert that, the receptacle can be safely handled and brought to a landfill and execution advances to block a new waste receptacle is provided as indicated in block 780. In some embodiments, determining whether the waste cart is full entails checking status of level sensors, for example, one or more photoelectric, resistive, capacitive, or weight sensors within or on the receptacle. Other embodiments may include a mechanism to compact waste within the cart that operates in conjunction with the fill sensors, to ensure full use of the receptacle capacity. Still other embodiments include automatic cart removal and replacement to reduce the need for manual handling of the waste receptacle.

FIGS. 8-12 are screen shots of a touch screen control interface display for use with systems 100 and 300. More particularly, FIGS. 10, 11, and 12 taken together show a sequence of control interface displays indicative of operational status of various system components, such as positional status of the lift mechanism, operational status of the shredder, auger status.

CONCLUSION

In the foregoing specification, specific embodiments have been described. However, one of ordinary skill in the art appreciates that various modifications and changes can be made without departing from the scope of the invention as set forth in the claims below. Accordingly, the specification and figures are to be regarded as illustrative rather than restrictive, and all such modifications are included within the scope of present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments or portions thereof can be implemented as a computer-readable volatile and/or non-volatile storage medium or memory (more generally a non-transitory machine-readable storage medium) having computer readable code or instructions stored thereon for directing operation of or causing programming of a computer (e.g., including one or more processors) to perform one or more portions of method as described and/or claimed herein. Exemplary computer-readable storage mediums include a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

The Abstract of the Disclosure is provided to allow the reader to quickly ascertain the nature of the technical disclosure. It is submitted with the understanding and intent that it not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A biomedical waste treatment assembly comprising:
    a shredder,
    an ozone generator; and
    a longitudinal waste treatment chamber having first and second opposing ends defining a length dimension, with the first end arranged to receive shredded biomedical waste from the shredder and positioned at a height lower than that of the second end to define an incline angle of at least 20 degrees, the chamber including:
        a set of one or more ozone injection points coupled to the ozone generator and distributed along the length dimension of the chamber;
        an auger having first and second auger ends arranged to convey shredded waste along the length dimension from the first end toward the second end of the chamber; and
        a partition positioned between the second auger end and the second end of the chamber, the partition dividing the chamber into a treatment portion and an exit portion, with the partition being transverse to the length dimension of the chamber and having at least one opening for allowing treated waste to move from the treatment portion to the exit portion, the opening having a cross-sectional area that is at least 20 percent less than-that of the chamber and the exit portion inclined to bias waste therein toward the partition and thereby inhibit passage of ozone through the at least one opening.

2. The biomedical waste treatment assembly of claim 1, further comprising a processing circuit coupled to a memory, with the memory including instructions for starting and stopping the auger from moving shredded waste along the length dimension when desired ozone sterilization conditions are not satisfied.

3. The biomedical waste treatment assembly of claim 2, further comprising a timer associated with the processing circuit, the timer configured to measure a cumulative treatment time that shredded biomedical waste within the chamber has been exposed to the desired ozone sterilization conditions, wherein the timer is configured to be started and stopped by the processing circuit in sync with the auger being stopped and started.

4. The biomedical waste treatment assembly of claim 3, wherein the processing circuit is further configured to start the auger and the timer in response to the desired ozone sterilization conditions being established in the chamber and to stop the auger and the timer in response to the desired ozone sterilization conditions being determined to not be established, and to restart the timer in response to the desired conditions being re-established.

5. The biomedical waste treatment assembly of claim 3, wherein the conditions include a desired ozone level and a desired humidity level within the chamber.

6. The biomedical waste treatment assembly of claim 5, wherein the conditions further include a desired temperature.

7. The biomedical waste treatment assembly of claim 5, wherein the conditions include a minimum desired ozone level as measured at a plurality of points along the length dimension of the chamber.

8. The assembly of claim 5, further including means for establishing and maintaining relative humidity within the chamber in excess of 70%.

9. The assembly of claim 1, wherein the incline angle is at least 40 degrees and the at least one opening in the partition has a cross-sectional area at least 50% less than that of the surrounding portion of the chamber.

10. The assembly of claim 1, wherein the incline angle is at least 60 degrees.

11. The assembly of claim 1, wherein the chamber has a cylindrical shape.

12. A biomedical waste treatment assembly comprising:
a shredder;
an ozone generator; and
a cylindrical-like waste treatment chamber having first and second opposing ends defining a length dimension, with the first end arranged to receive shredded biomedical waste from the shredder, and positioned at a height lower than that of the second end to define an incline angle of at least 40 degrees, the chamber including:
a set of one or more ozone injection points coupled to the ozone generator and distributed along a length dimension of the chamber;
an auger having first and second auger ends arranged to convey shredded waste along the length dimension from the first end toward the second end of the chamber; and
a partition positioned between the second auger end and the second end of the chamber, the partition dividing the chamber into a treatment portion and an exit portion, with the partition having at least one opening for allowing treated waste to move from the treatment portion to the exit portion, the opening having a cross-sectional area that is at least 20 percent less than that of a surrounding portion of the chamber, and the exit portion inclined to bias waste therein toward the partition; and
means for establishing and maintaining relative humidity within the chamber in excess of 70%.

13. The biomedical waste treatment assembly of claim 11, further comprising a processing circuit coupled to a memory, with the memory including instructions for starting and stopping the auger from moving shredded waste along the length dimension when desired ozone sterilization conditions are not satisfied.

14. The biomedical waste treatment assembly of claim 12, further comprising a timer associated with the processing circuit, the timer configured to measure a cumulative treatment time that shredded biomedical waste within the chamber has been exposed to the desired ozone sterilization conditions, wherein the timer is configured to be started and stopped by the processing circuit in sync with the auger being stopped and started.

15. The biomedical waste treatment assembly of claim 12, wherein the processing circuit is further configured to start the auger and the timer in response to the desired ozone sterilization conditions being established in the chamber and to stop the auger and the timer in response to the desired ozone sterilization conditions being determined to not be established, and to restart the timer in response to the desired conditions being re-established.

16. A biomedical waste treatment assembly comprising:

a shredder;

an ozone generator; and an inclined waste treatment chamber having lower and upper ends positioned to define a length dimension and an incline angle of at least 20 degrees, with the lower end arranged to receive shredded biomedical waste from the shredder;

a set of two or more ozone injection points coupled to the ozone generator and distributed along a length of the chamber;

an auger positioned at least partly within the chamber to convey shredded waste from a lower portion of the chamber toward the upper chamber end, the auger having a lower auger end positioned adjacent the lower chamber end and an upper auger end positioned adjacent the upper chamber end; and a partition dividing the chamber into a treatment portion and an exit portion, with the partition positioned between the upper auger end and the upper chamber end and having at least one opening for allowing ozone treated waste to move from the treatment portion to the exit portion via operation of the auger, with the at least one opening having a cross-sectional area that is at least 20 percent less than-that of a portion the chamber surrounding the partition and the exit portion inclined to bias treated waste therein toward the partition and thereby inhibit ozone passage through the at least one opening.

17. The assembly of claim 16, wherein the lower auger end is coupled to motor positioned adjacent to the lower chamber end.

18. The assembly of claim 16, wherein the chamber has a form at least approximating a cylinder, and the cross-sectional area of the at least one opening is at least 50% less than that of the chamber.

19. The assembly of claim 16, wherein the partition has a generally planar surface oriented toward the lower end of the chamber.

20. The assembly of claim 16, further comprising exit control means for controlling rate of waste exit from the exit portion of the chamber.

* * * * *